US012782489B2

(12) United States Patent
Wilkerson, Jr.

(10) Patent No.: US 12,782,489 B2
(45) Date of Patent: Nov. 3, 2026

(54) SYSTEMS AND METHODS FOR PHASE MONOPULSE BEAM POINTING

(71) Applicant: TRAK TECOM Corporation, Tampa, FL (US)

(72) Inventor: James Allan Wilkerson, Jr., Melbourne, FL (US)

(73) Assignee: TRAK TECOM Corporation, Tampa, FL (US)

( * ) Notice: Subject to any disclaimer, the term of this patent is extended or adjusted under 35 U.S.C. 154(b) by 291 days.

(21) Appl. No.: 18/853,213

(22) PCT Filed: Sep. 29, 2022

(86) PCT No.: PCT/US2022/045138
§ 371 (c)(1),
(2) Date: Oct. 1, 2024

(87) PCT Pub. No.: WO2023/177420
PCT Pub. Date: Sep. 21, 2023

(65) Prior Publication Data

US 2025/0224477 A1 Jul. 10, 2025

Related U.S. Application Data

(60) Provisional application No. 63/250,660, filed on Sep. 30, 2021.

(51) Int. Cl.
*G01S 3/42* (2006.01)
*G01S 3/48* (2006.01)
*H04B 7/185* (2006.01)

(52) U.S. Cl.
CPC *G01S 3/42* (2013.01); *G01S 3/48* (2013.01); *H04B 7/18517* (2013.01)

(58) Field of Classification Search
CPC ..... G01S 3/48; G01S 3/42; G01S 7/48; G01S 7/52; G01S 13/34; H04B 7/18517;
(Continued)

(56) References Cited

U.S. PATENT DOCUMENTS 5,255,000 A 10/1993 Puzzo
5,594,460 A 1/1997 Eguchi
(Continued)

OTHER PUBLICATIONS

European Extended Search Report, Application No. 22932462.9, dated Sep. 16, 2025, 9 pages.
(Continued)

*Primary Examiner* — Anthony S Addy
(74) *Attorney, Agent, or Firm* — Snell & Wilmer LLP

(57) ABSTRACT

A beam pointing system is provided. The beam pointing system includes first and second antenna segments positioned at first and second locations and configured to produce first and second beam signals in response to receiving a beam from a source and a digital signal processor (DSP) coupled in communication with the first and second antenna segments. The DSP is configured to receive the first and second beam signals, compute a weighted phase difference signal between the first beam signal and the second beam signal by performing a phase subtraction in complex space, compute an average phase difference based on the weighted phase difference signal by averaging the weighted phase difference signal over a plurality of samples, compute a pointing error based on the average phase difference, and cause a pointing of the first antenna segment and the second antenna segment to be adjusted based on the pointing error.

20 Claims, 4 Drawing Sheets

(58) Field of Classification Search
CPC .... H04B 7/185; H04B 7/1855; H04B 7/0617; H04B 7/18515; H04B 7/2041; H04B 7/18513; H04B 7/0413; H04B 10/118; H04B 7/024; H04B 7/18508; H04B 7/18534; H04B 7/18586; H04B 7/18589; H04B 7/086; H04B 7/0842; H01Q 3/26; H01Q 3/40; H01Q 1/288; H01Q 21/24; H04W 16/28; H04W 16/26
See application file for complete search history.

(56) References Cited

U.S. PATENT DOCUMENTS

| | | | | |
|---|---|---|---|---|
| 8,212,716 | B2 | 7/2012 | Goshen et al. | |
| 8,219,039 | B2 | 7/2012 | Yamazaki et al. | |
| 8,339,307 | B2 * | 12/2012 | Craig | H04B 7/18515 342/354 |
| 8,761,835 | B2 * | 6/2014 | Athley | H04B 17/10 455/60 |
| 10,218,478 | B2 | 2/2019 | Kim et al. | |
| 10,321,461 | B2 | 6/2019 | Jalali | |
| 2008/0303718 | A1 | 12/2008 | Chiang et al. | |
| 2010/0231442 | A1 | 9/2010 | Craig et al. | |
| 2016/0118715 | A1 | 4/2016 | Adams et al. | |
| 2018/0359647 | A1 | 12/2018 | Noerpel et al. | |
| 2020/0292690 | A1 | 9/2020 | Kim et al. | |
| 2023/0327725 | A1 * | 10/2023 | Wang | H04B 7/0469 370/329 |

OTHER PUBLICATIONS

PCT International Search Report and Written Opinion, Application No. PCT/US2022/045138, dated Oct. 4, 2023, 14 pages.

Michael A. Lombardi et al., "Time and Frequency Measurements Using the Global Positioning System", Sep. 30, 2001, pp. 26-33.

Shijin Li et al., "An Adaptive Weighted Phase Optimization Algorithm Based on the Sigmoid Model for Distributed Scatterers", Remote Sensing, Aug. 17, 2021, 19 pages.

* cited by examiner

SYSTEMS AND METHODS FOR PHASE MONOPULSE BEAM POINTING

BACKGROUND

The embodiments described herein relate generally to antenna beam pointing and, more particularly, to beam pointing for a source that is moving relative to the antenna.

Communication systems using narrow beam high gain antennas require accurate antenna pointing to center the antenna beam on the desired signal. This is particularly important for systems that also use the antenna beamwidth to reject closely spaced undesired signals. This description applies to current satellite communication (SatCom) systems, in which low signal strength and long range necessitate a high gain, narrow beam antenna. This antenna must also reject interference from adjacent satellites and meet regulatory limits on beam pointing accuracy. For example, antenna pointing error may be limited to 0.2 degrees maximum, to limit interference to or from adjacent satellites.

These pointing requirements can be satisfied without active tracking for stationary antennae communicating with geosynchronous (satellites, for which antenna position can be set during installation and need not change except to select a different desired satellite. Communication links including a moving platform (e.g., aircraft, vehicle, ship, etc.), non-geosynchronous satellites (low earth orbit (LEO) or medium earth orbit (MEO), etc.), or other moving targets require accurate active antenna pointing to compensate for platform and/or satellite motion.

One current system for accomplishing beam pointing utilizes scanning, or changing antenna position to identify a peak signal amplitude, which is slower and may be inaccurate for rapidly moving platforms. Another current system compares signals from separate antenna segments to form sum and difference channels and computes a signed error by mixing the sum and difference channels. However, the difference channel generally has a low signal-to-noise ratio (SNR), which limits the accuracy and speed of this approach. Accordingly, an improved system for antenna beam pointing is desirable.

BRIEF SUMMARY

In one aspect, a beam pointing system is provided. The beam pointing system includes a first antenna segment positioned at a first location and configured to produce a first beam signal in response to receiving a beam from a source. The beam pointing system further includes a second antenna segment positioned at a second location and configured to produce a second beam signal in response to receiving the beam from the source. The beam pointing system further includes a digital signal processor (DSP) coupled in communication with the first antenna segment and the second antenna segment. The DSP is configured to receive the first beam signal from the first antenna segment and the second beam signal from the second antenna segment. The DSP is further configured to compute a weighted phase difference signal between the first beam signal and the second beam signal by performing a phase subtraction in complex space. The DSP is further configured to compute an average phase difference based on the weighted phase difference signal by averaging the weighted phase difference signal over a plurality of samples. The DSP is further configured to compute a pointing error based on the average phase difference. The DSP is further configured to cause a pointing of the first antenna segment and the second antenna segment to be adjusted based on the pointing error.

In another aspect, a method for beam pointing is provided. The method includes producing, by a first antenna segment positioned at a first location, a first beam signal in response to receiving a beam from a source. The method further includes producing, by a second antenna segment positioned at a second location, a second beam signal in response to receiving the beam from the source. The method further includes receiving, by a DSP, the first beam signal from the first antenna segment and the second beam signal from the second antenna segment. The method further includes computing, by the DSP, a weighted phase difference signal between the first beam signal and the second beam signal by performing a phase subtraction in complex space. The method further includes computing, by the DSP, an average phase difference based on the weighted phase difference signal by averaging the weighted phase difference signal over a plurality of samples. The method further includes computing, by the DSP, a pointing error based on the average phase difference. The method further includes causing, by the DSP, a pointing of the first antenna segment and the second antenna segment to be adjusted based on the pointing error.

In another aspect, a DSP is provided. The DSP is coupled in communication with a first antenna segment and a second antenna segment. The first antenna segment is configured to produce a first beam signal in response to receiving a beam from a source, and the second antenna segment is configured to produce a second beam signal in response to receiving the beam from the source. The DSP is configured to receive the first beam signal from the first antenna segment and the second beam signal from the second antenna segment. The DSP is further configured to compute a weighted phase difference signal between the first beam signal and the second beam signal by performing a phase subtraction in complex space. The DSP is further configured to compute an average phase difference based on the weighted phase difference signal by averaging the weighted phase difference signal over a plurality of samples. The DSP is further configured to compute a pointing error based on the average phase difference. The DSP is further configured to cause a pointing of the first antenna segment and the second antenna segment to be adjusted based on the pointing error.

BRIEF DESCRIPTION OF THE DRAWINGS

FIG. 1 is a block diagram of an example beam pointing system;

FIG. 2 is a block diagram of an example segment receiver for use with the beam pointing system shown in FIG. 1;

FIG. 3 is a diagram depicting an example arrangement of antenna segments for use in the example beam pointing system shown in FIG. 1.

DETAILED DESCRIPTION

In the following specification and the claims, reference will be made to a number of terms, which shall be defined to have the following meanings.

The singular forms “a”, “an”, and “the” include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", is not to be limited to the precise value specified. In at least some instances, the approximating language may correspond to the precision of an instrument for measuring the value. Here and throughout the specification and claims, range limitations are combined and interchanged, such ranges are identified and include all the sub-ranges contained therein unless context or language indicates otherwise.

The disclosed systems and methods include a beam pointing system. The beam pointing system includes a plurality of antenna segments, each positioned at respective locations and configured to, in response to receiving a beam such as an electric communication signal from a source such as a transmitter located on a moving platform or satellite, produce respective beam signals, which are local electric signals representing the beam as received by respective antenna segments at their respective locations. The antenna segments may be different antennas of an array of antennas, distinct portions of a single antenna structure, or a combination thereof.

The beam pointing system further includes a digital signal processor (DSP) coupled in communication with the plurality of antennas. The DSP is configured to receive a beam signal from a first of the antenna segments and a second beam signal from a second of the antenna segments. The DSP is further configured to compute a weighted phase difference signal between the first beam signal and the second beam signal by performing a phase subtraction in complex space, compute an average phase difference based on the weighted phase difference signal by averaging the weighted phase difference signal over a plurality of samples, and compute a pointing error based on the average phase difference. The pointing error is a signed angle that may be used to adjust a pointing of the antenna segments so that they are aligned with the source. This calculation and realignment is performed repeatedly, so that the antenna segments are continuously moved to remain aligned with the source. Because the disclosed beam pointing system does not rely on a low SNR difference channel to compute pointing error, but instead directly compares the phase of the individual antenna segment outputs, the SNR of the resulting processing is improved, enabling faster and more accurate tracking.

Figure 1:
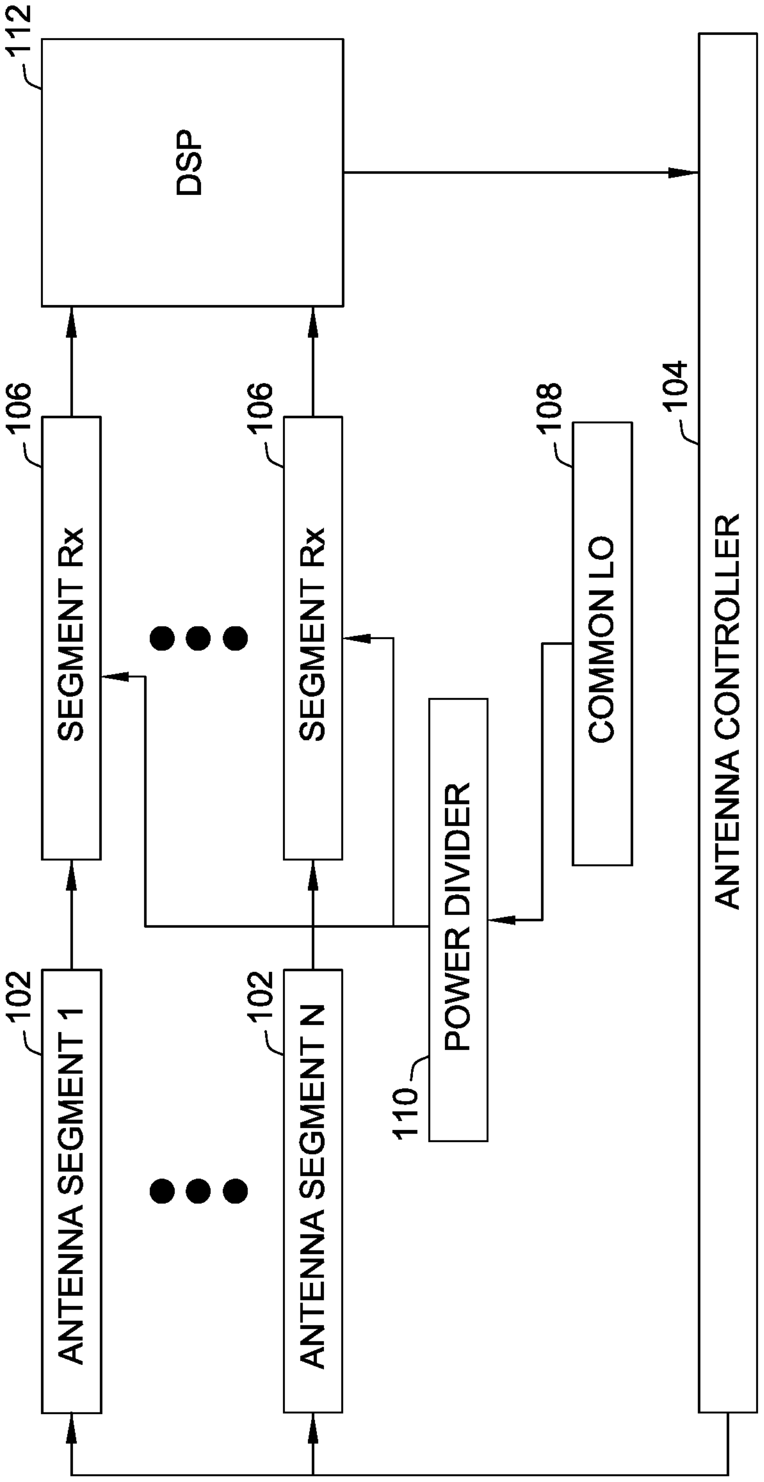
FIGS. 1-3 show example embodiments of the systems and methods described herein.

FIG. 1 illustrates an example beam pointing system 100. Beam pointing system 100 includes a plurality of antenna segments 102, an antenna controller 104, segment receivers 106, a common local oscillator (LO) 108, a power divider 110, and a digital signal processor (DSP) 112.

Antenna segments 102 are configured to receive an electronic communication signal transmitted from a moving source, such as a telecommunication satellite. Antenna segments 102 have a narrow beam and high gain, which enables a beam of antenna segments 102 to be centered on a desired signal. Antenna segments 102 may be separate antennas, or components of a multiple output divided antenna having outputs that may be compared and/or analyzed separately. For example, two antenna segments 102 may each receive a beam to generate a respective first beam signal and second beam signal. While the first beam signal and second beam signal will generally have the same carrier frequency component, due to the differing physical positions of the two antenna segments 102, a phase difference exists between the first beam signal and the second beam signal. In addition, each of the beam signals have respective amplitude modulation (AM) components, phase modulation (PM) components, and noise. Antenna controller 104 is configured to control an orientation of antenna segments 102 to redirect the beam of antenna segments 102 towards the source.

Segment receivers 106 are coupled between respective antenna segments 102 and DSP 112 and are configured to convert the beam signals received from the respective antenna segments 102 to digital signals representing in-phase (I) and quadrature (Q) components of the received beam signals. Common LO 108 generates a local frequency signal that is provided to each segment receiver 106.

Figure 2:
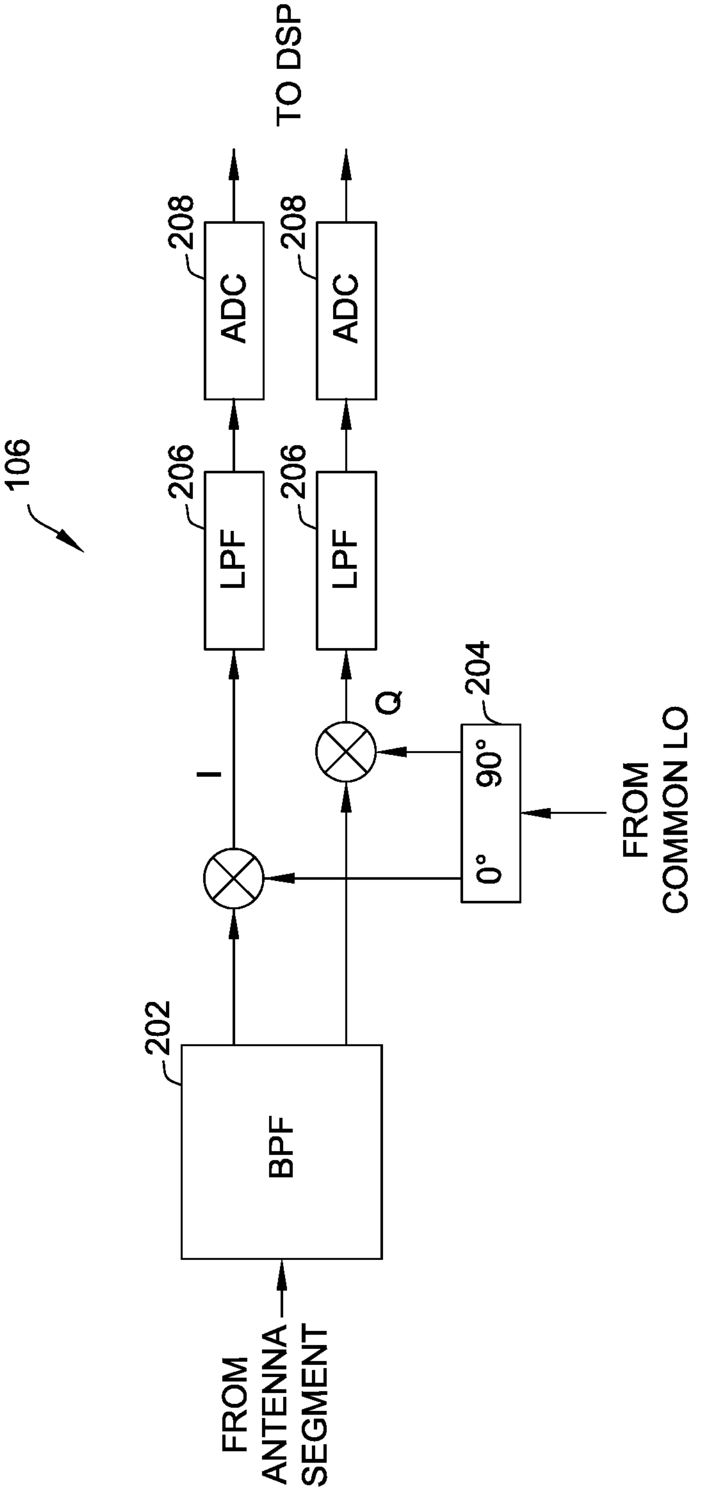

Referring to FIG. 2, each segment receiver 106 includes a bandpass filter (BPF) 202 that filters the signals received at antenna segments 102 to the desired frequency band. Segment receiver 106 further includes a local divider 204 that divides the local frequency signal generated by common LO 108 into components with zero degree and ninety degree phase shifts, which are each mixed with the filtered beam signal to generate I and Q components, respectively. Because a single common LO 108 is utilized, the phase difference between each of the beam signals is maintained.

Segment receiver 106 further includes a low pass filter (LPF) 206 configured to filter the resulting I and Q signals to a set pre-detection bandwidth. The pre-detection bandwidth is less than or equal to a bandwidth of modulated signal components of the received beam signals, and need not be matched to this signal modulation. Because a power spectral density relationship between signal and noise is approximately constant across the signal bandwidth, a SNR of the filtered output is approximately the same for any selected pre-detection bandwidth that is less than the signal bandwidth. While utilizing a pre-detection bandwidth that is narrower than that of the modulated signal may disturb the modulation waveform by generating inter-symbol interference, there is no effect on the phase difference between the different received beam signals, because each receives the same filtering.

Segment receiver 106 further includes an analog-to-digital converter (ADC) 208 configured to convert the filtered I and Q signals output by LPF 206 to digital signals that are interpreted by DSP 112. The I and Q signals are digitized with a sample rate sufficient to resolve modulation and noise time waveforms from the signals that remain following the filtering. The sample rate is set based on the pre-detection bandwidth and need not be high enough to resolve modulation of the original signal.

Referring back to FIG. 1, DSP 112 is configured to compute a weighted phase difference between the first beam signal and the second beam signal. This calculation is performed in complex space using the filtered and digitized I and Q signals output by segment receivers 106. The weighted phase difference has a magnitude equal to a sum of the magnitudes of the first and second beam signals, and an angle equal to a difference between the respective angles of the first and second beam signals. A phase of this result is independent of any PM components of the beam signals.

DSP 112 is further configured to average the weighted phase difference over may samples, and to determine an average phase from the averaged weighted phase difference using a phase detector. This process inherently gives more weight to the higher amplitude signal samples, and results in higher SNR than averaging the detected phases of the received beam signals directly, as direct phase detection of low SNR signals produces more noise due to the large phase excursions possible for signals near zero amplitude. In some embodiments, lower amplitude signals (e.g., those falling below a threshold amplitude) are gated and excluded from the average, which further emphasizes higher amplitude signal samples to increase SNR.

DSP 112 is further configured to compute a pointing error, which is a signed angle between the current beam position and the peak amplitude, based on the average phase difference. The average phase difference is equal to the pointing error multiplied by _, where d is a distance between the first and second antenna segments, and is a wavelength of the received beam signal. DSP 112 is further configured to instruct antenna controller 104 to adjust the pointing of antenna segments 102 based on the computed pointing error.

In some embodiments, DSP 112 utilizes a two-axis calculation to compute a pointing error along two dimensions. In such embodiments, four beam signals received at respective antenna segments 102 are down-converted into I and Q components, filtered, and converted to digital signals as described above. The four beam signals correspond to four quadrants (e.g., northeast, northwest, southeast, and southwest). DSP 112 computes a single sum of the four beam signals as well as four half-channel sums (e.g., north computed from northeast and northwest, south computed from southeast and southwest, east computed from northeast and southeast, and west computed from northwest and southwest). DSP 112 is configured to compute phase difference value between north and south and between east and west, and then compute corresponding pointing error values along the north-south and east-west axes. The position of antenna segments 102 may then be updated based on these two computed pointing error values.

Figure 3:
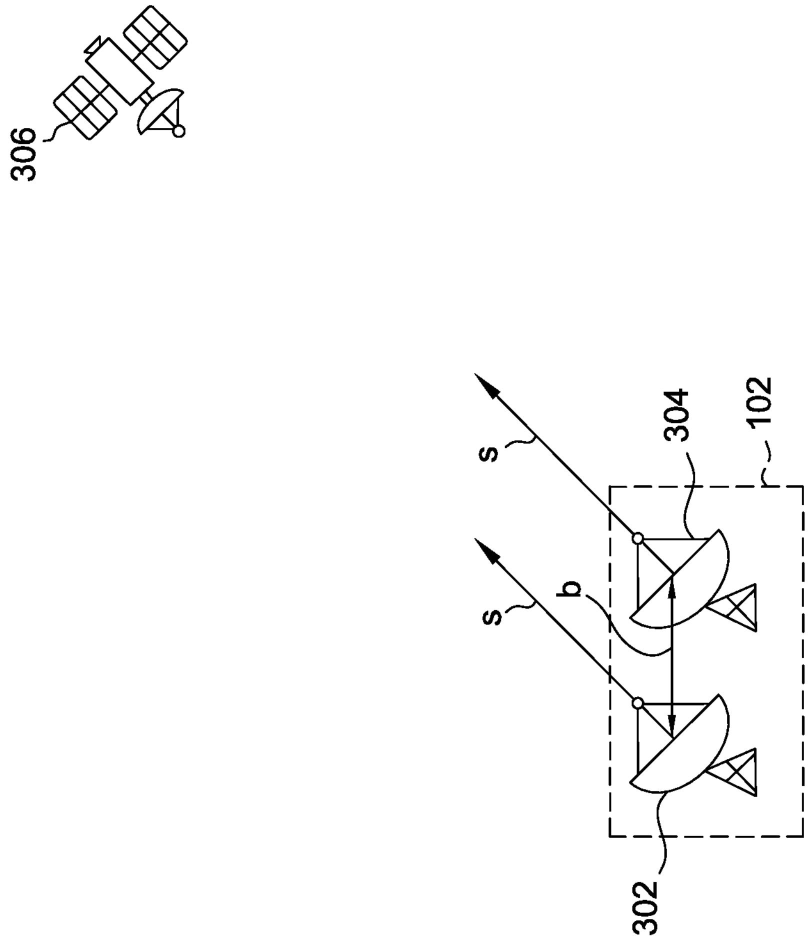

FIG. 3 illustrates a first antenna segment 302 and second antenna segment 304 of antenna segments 102 positioned to receive a beam from a source 306. While first antenna segment 302 and second antenna segment 304 are depicted as separate antennas, in some embodiments, first antenna segment 302 and second antenna segment 304 are portions of a single antenna structure or array. Likewise, while source 306 is depicted as a satellite-mounted source, source 306 may be any source that moves with respect to first antenna segment 302 and second antenna segment 304. First antenna segment 302 and second antenna segment 304 are spaced by a baseline distance b, and are oriented in a direction defined by a unit vector s. A time delay $\tau_g$ between first antenna segment 302 and second antenna segment 304 is equal to a quotient of a dot product s and b and the speed of light. A phase difference between first antenna segment 302 and second antenna segment 304 is a product of $2\pi$, $\tau_g$, and v, where v is a wave number of the beam transmitted by source 306 expressed in radians per meter.

Figure 4:
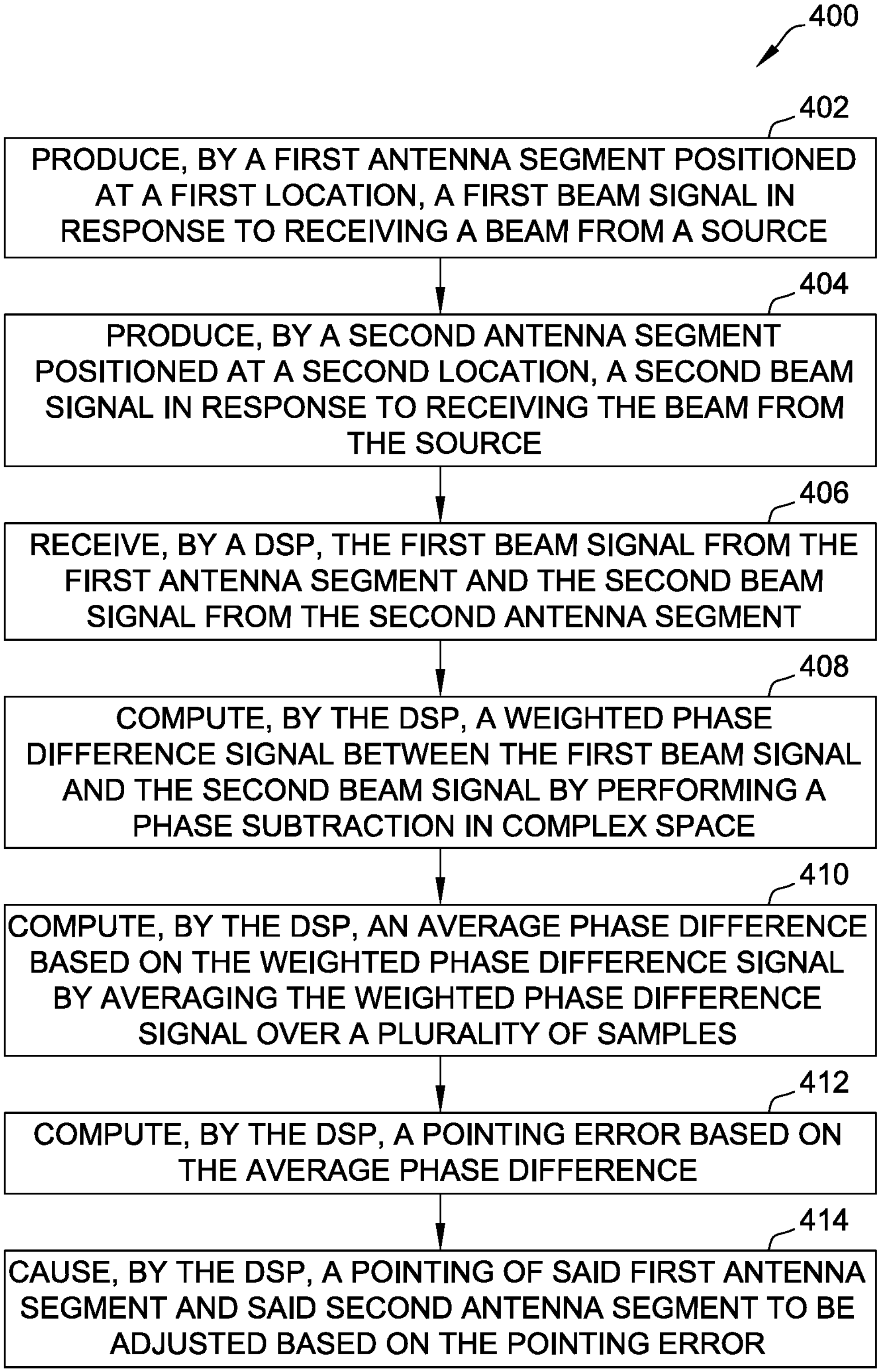
FIG. 4 is a flowchart of an example method for beam pointing performed by the example beam pointing system shown in FIG. 1.

FIG. 4 is a flowchart of an example method 400 for beam pointing, which may be performed by beam pointing system 100 shown in FIG. 1. Method 400 includes producing 402, by a first antenna segment (such as first antenna segment 302 of antenna segments 102) positioned at a first location, a first beam signal in response to receiving a beam from a source (such as source 306).

Method 400 further includes producing 404, by a second antenna segment (such as second antenna segment 304 of antenna segments 102) positioned at a second location, a second beam signal in response to receiving the beam from the source.

Method 400 further includes receiving 406, by a DSP (such as DSP 112), the first beam signal from the first antenna segment and the second beam signal from the second antenna segment.

Method 400 further includes computing 408, by the DSP, a weighted phase difference signal between the first beam signal and the second beam signal by performing a phase subtraction in complex space. In certain embodiments, computing 408 the weighted phase difference signal includes computing a sum of a first magnitude of the first beam signal and a second magnitude of the second beam signal and computing a difference between a first angle of the first beam signal and a second angle of the second beam signal.

Method 400 further includes computing 410, by the DSP, an average phase difference based on the weighted phase difference signal by averaging the weighted phase difference signal over a plurality of samples.

Method 400 further includes computing 412, by the DSP, a pointing error based on the average phase difference; and Method 400 further includes causing 414, by the DSP, a pointing of the first antenna segment and the second antenna segment to be adjusted based on the pointing error.

In some embodiments, method 400 further includes generating, by a common LO (such as common LO 108), a local signal that is mixed with the first beam signal and the second beam signal to convert the first beam signal and the second beam signal into I and Q components.

In certain embodiments, method 400 further includes converting, by an ADC (such as ADC 208), the first beam signal and the second beam signal to digital signals.

In some embodiments, method 400 further includes filtering, by an LPF (such as LPF 206), the first beam signal and the second beam signal to a pre-detection bandwidth.

In certain embodiments, to enable two-dimensional antenna beam pointing, method 400 further includes producing, by a third antenna segment positioned at a third location, a third beam signal in response to receiving the beam from the source, producing, by a fourth antenna segment positioned at a fourth location, a fourth beam signal in response to receiving the beam from the source; and computing, by the DSP, the pointing error in two dimensions based on the first beam signal, the second beam signal, the third beam signal, and the fourth beam signal.

In some such embodiments, the first beam signal corresponds to a first quadrant, the second beam signal corresponds to a second quadrant adjacent to the first quadrant, the third beam signal corresponds to a third quadrant adjacent to the second quadrant, the fourth beam signal corresponds to a fourth quadrant adjacent to the first quadrant and the second quadrant, and method 400 further includes computing a full sum based on the first beam signal, the second beam signal, the third beam signal, and the fourth beam signal, computing four half-sums based on adjacent beam signals of the first beam signal, the second beam signal, the third beam signal, and the fourth beam signal, and computing, a first phase difference value and a second phase difference value based on non-adjacent half-sums of the four half-sums and the full sum, the first phase difference value corresponding to a first axis and the second phase difference value corresponding to a second axis.

Example embodiments of methods and systems for antenna beam pointing are described above in detail. The methods and systems are not limited to the specific embodiments described herein, but rather, components of systems and/or steps of the methods may be used independently and separately from other components and/or steps described herein. Accordingly, the example embodiments can be implemented and used in connection with many other applications not specifically described herein.

Technical effects of the systems and methods described herein include at least one of: (a) improving SNR for computing a pointing error signal by computing an average phase difference between a first beam signal received at a first antenna segment and a second antenna segment; and (b) improving speed and accuracy of computing pointing error by computing an computing an average phase difference between a first beam signal received at a first antenna segment and a second antenna segment.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose various embodiments, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A beam pointing system comprising:

a first antenna segment positioned at a first location and configured to produce a first beam signal in response to receiving a beam from a source;

a second antenna segment positioned at a second location and configured to produce a second beam signal in response to receiving the beam from the source;

a digital signal processor (DSP) coupled in communication with said first antenna segment and said second antenna segment and configured to:

receive the first beam signal from said first antenna segment and the second beam signal from said second antenna segment;

compute a weighted phase difference signal between the first beam signal and the second beam signal by performing a phase subtraction in complex space;

compute an average phase difference based on the weighted phase difference signal by averaging the weighted phase difference signal over a plurality of samples;

compute a pointing error based on the average phase difference; and cause a pointing of said first antenna segment and said second antenna segment to be adjusted based on the pointing error.

2. The beam pointing system of claim 1, further comprising a common local oscillator configured to generate a local signal that is mixed with the first beam signal and the second beam signal to convert the first beam signal and the second beam signal into in-phase (I) and quadrature (Q) components.

3. The beam pointing system of claim 1, further comprising an analog to digital converter configured to convert the first beam signal and the second beam signal to digital signals.

4. The beam pointing system of claim 1, further comprising a low pass filter configured to filter the first beam signal and the second beam signal to a pre-detection bandwidth.

5. The beam pointing system of claim 1, wherein to compute the weighted phase difference signal, said DSP is configured to:

compute a sum of a first magnitude of the first beam signal and a second magnitude of the second beam signal; and compute a difference between a first angle of the first beam signal and a second angle of the second beam signal.

6. The beam pointing system of claim 1, further comprising:

a third antenna segment positioned at a third location and configured to produce a third beam signal in response to receiving the beam from the source; and a fourth antenna segment positioned at a fourth location and configured to produce a fourth beam signal in response to receiving the beam from the source, wherein said DSP is further configured to compute the pointing error in two dimensions based on the first beam signal, the second beam signal, the third beam signal, and the fourth beam signal.

7. The beam pointing system of claim 6, wherein the first beam signal corresponds to a first quadrant, the second beam signal corresponds to a second quadrant adjacent to the first quadrant, the third beam signal corresponds to a third quadrant adjacent to the second quadrant, and the fourth beam signal corresponds to a fourth quadrant adjacent to the first quadrant and the second quadrant, and wherein said DSP is further configured to:

compute a full sum based on the first beam signal, the second beam signal, the third beam signal, and the fourth beam signal;

compute four half-sums based on adjacent beam signals of the first beam signal, the second beam signal, the third beam signal, and the fourth beam signal; and compute a first phase difference value and a second phase difference value based on non-adjacent half-sums of the four half-sums and the full sum, the first phase difference value corresponding to a first axis and the second phase difference value corresponding to a second axis.

8. A method for beam pointing, said method comprising:

producing, by a first antenna segment positioned at a first location, a first beam signal in response to receiving a beam from a source;

producing, by a second antenna segment positioned at a second location, a second beam signal in response to receiving the beam from the source;

receiving, by a DSP, the first beam signal from the first antenna segment and the second beam signal from the second antenna segment;

computing, by the DSP, a weighted phase difference signal between the first beam signal and the second beam signal by performing a phase subtraction in complex space;

computing, by the DSP, an average phase difference based on the weighted phase difference signal by averaging the weighted phase difference signal over a plurality of samples;

computing, by the DSP, a pointing error based on the average phase difference; and causing, by the DSP, a pointing of the first antenna segment and the second antenna segment to be adjusted based on the pointing error.

9. The method of claim 8, further comprising generating, by a common local oscillator, a local signal that is mixed with the first beam signal and the second beam signal to convert the first beam signal and the second beam signal into in-phase (I) and quadrature (Q) components.

10. The method of claim 8, further comprising converting, by an analog to digital converter, the first beam signal and the second beam signal to digital signals.

11. The method of claim 8, further comprising filtering, by a low pass filter, the first beam signal and the second beam signal to a pre-detection bandwidth.

12. The method of claim 8, wherein computing the weighted phase difference signal comprises:
computing, by the DSP, a sum of a first magnitude of the first beam signal and a second magnitude of the second beam signal; and
computing, by the DSP, a difference between a first angle of the first beam signal and a second angle of the second beam signal.

13. The method of claim 8, further comprising:
producing, by a third antenna segment positioned at a third location, a third beam signal in response to receiving the beam from the source;
producing, by a fourth antenna segment positioned at a fourth location, a fourth beam signal in response to receiving the beam from the source; and
computing, by the DSP, the pointing error in two dimensions based on the first beam signal, the second beam signal, the third beam signal, and the fourth beam signal.

14. The method of claim 13, wherein the first beam signal corresponds to a first quadrant, the second beam signal corresponds to a second quadrant adjacent to the first quadrant, the third beam signal corresponds to a third quadrant adjacent to the second quadrant, and the fourth beam signal corresponds to a fourth quadrant adjacent to the first quadrant and the second quadrant, and wherein said method further comprises:
computing, by the DSP, a full sum based on the first beam signal, the second beam signal, the third beam signal, and the fourth beam signal;
computing, by the DSP, four half-sums based on adjacent beam signals of the first beam signal, the second beam signal, the third beam signal, and the fourth beam signal; and
computing, by the DSP, a first phase difference value and a second phase difference value based on non-adjacent half-sums of the four half-sums and the full sum, the first phase difference value corresponding to a first axis and the second phase difference value corresponding to a second axis.

15. A digital signal processor (DSP) coupled in communication with a first antenna segment positioned at a first location and a second antenna segment positioned at a second location, the first antenna segment configured to produce a first beam signal in response to receiving a beam from a source, the second antenna segment configured to produce a second beam signal in response to receiving the beam from the source, said DSP configured to:
receive the first beam signal from the first antenna segment and the second beam signal from the second antenna segment;
compute a weighted phase difference signal between the first beam signal and the second beam signal by performing a phase subtraction in complex space;
compute an average phase difference based on the weighted phase difference signal by averaging the weighted phase difference signal over a plurality of samples;
compute a pointing error based on the average phase difference; and
cause a pointing of the first antenna segment and the second antenna segment to be adjusted based on the pointing error.

16. The DSP of claim 15, wherein the first beam signal and the second beam signal are converted into in-phase (I) and quadrature components using a plurality of local signal generated by a common local oscillator.

17. The DSP of claim 15, wherein the first beam signal and the second beam signal are filtered to a pre-detection bandwidth by a low pass filter.

18. The DSP of claim 15, wherein to compute the weighted phase difference signal, said DSP is configured to:
compute a sum of a first magnitude of the first beam signal and a second magnitude of the second beam signal; and
compute a difference between a first angle of the first beam signal and a second angle of the second beam signal.

19. The DSP of claim 15, further configured to:
receive, from a third antenna segment positioned at a third location, a third beam signal in response to receiving the beam from the source;
receive, from a fourth antenna segment positioned at a fourth location, a fourth beam signal in response to receiving the beam from the source; and
compute the pointing error in two dimensions based on the first beam signal, the second beam signal, the third beam signal, and the fourth beam signal.

20. The DSP of claim 19, wherein the first beam signal corresponds to a first quadrant, the second beam signal corresponds to a second quadrant adjacent to the first quadrant, the third beam signal corresponds to a third quadrant adjacent to the second quadrant, and the fourth beam signal corresponds to a fourth quadrant adjacent to the first quadrant and the second quadrant, and wherein said DSP is further configured to:
compute a full sum based on the first beam signal, the second beam signal, the third beam signal, and the fourth beam signal;
compute four half-sums based on adjacent beam signals of the first beam signal, the second beam signal, the third beam signal, and the fourth beam signal; and
compute a first phase difference value and a second phase difference value based on non-adjacent half-sums of the four half-sums and the full sum, the first phase difference value corresponding to a first axis and the second phase difference value corresponding to a second axis.

* * * * *